US012787054B2

(12) United States Patent
Jiang et al.

(10) Patent No.: US 12,787,054 B2
(45) Date of Patent: Nov. 3, 2026

(54) TWO-STEP RANDOM ACCESS METHOD AND APPARATUS, AND DEVICE

(71) Applicant: VIVO MOBILE COMMUNICATION CO., LTD., Dongguan (CN)

(72) Inventors: Dajie Jiang, Dongguan (CN); Jin Liu, Dongguan (CN); Baolong Chen, Dongguan (CN); Yongchun Bai, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 645 days.

(21) Appl. No.: 18/204,929

(22) Filed: Jun. 1, 2023

(65) Prior Publication Data

US 2023/0354408 A1 Nov. 2, 2023

Related U.S. Application Data

(63) Continuation of application No. PCT/CN2021/134967, filed on Dec. 2, 2021.

(30) Foreign Application Priority Data

Dec. 4, 2020 (CN) ........................ 202011408563.6

(51) Int. Cl.
*H04W 74/00* (2009.01)
*H04W 74/0836* (2024.01)
*H04W 52/24* (2009.01)

(52) U.S. Cl.
CPC ..... *H04W 74/004* (2013.01); *H04W 74/0836* (2024.01); *H04W 52/24*2 (2013.01)

(58) Field of Classification Search
None
See application file for complete search history.

(56) References Cited

U.S. PATENT DOCUMENTS

| | | | | |
|---|---|---|---|---|
| 11,690,096 | B2 * | 6/2023 | Kim | H04L 1/0003 370/329 |
| 11,832,212 | B2 * | 11/2023 | Zhou | H04L 25/0226 |
| 11,864,142 | B2 * | 1/2024 | Cheng | G01S 19/256 |
| 12,108,440 | B2 * | 10/2024 | Kim | H04L 1/0003 |
| 12,363,755 | B2 * | 7/2025 | Wei | H04W 74/08 |

(Continued)

FOREIGN PATENT DOCUMENTS

| | | |
|---|---|---|
| CN | 111277382 A | 6/2020 |
| CN | 111756501 A | 10/2020 |

(Continued)

OTHER PUBLICATIONS

Ericsson, “Status Report for Further LTE Physical LayerEnhancements for MTC”3GPP tsg_ran\TSG_RAN, RP-151672, Dec. 2015, 47 pages.

(Continued)

*Primary Examiner* — Faiyazkhan Ghafoerkhan
(74) *Attorney, Agent, or Firm* — IPX PLLC

(57) ABSTRACT

A random access method and apparatus and a device are provided. The method includes: sending a message A in two-step random access. The message A includes a preamble and a Physical Uplink Shared Channel (PUSCH). At least one of related information of the preamble or related information of the PUSCH indicates location-related information of a terminal.

17 Claims, 7 Drawing Sheets

(56) References Cited

U.S. PATENT DOCUMENTS

| | | | | |
|---|---|---|---|---|
| 2020/0100299 | A1* | 3/2020 | Loehr | H04L 5/0094 |
| 2021/0014900 | A1* | 1/2021 | Lei | H04W 4/70 |
| 2021/0120581 | A1* | 4/2021 | Kim | H04L 1/0003 |
| 2021/0289465 | A1* | 9/2021 | Lee | H04L 5/0051 |
| 2021/0360594 | A1* | 11/2021 | Park | H04B 7/0408 |
| 2021/0360701 | A1* | 11/2021 | Xu | H04B 17/327 |
| 2022/0030544 | A1* | 1/2022 | Zhou | H04L 25/0226 |
| 2022/0070920 | A1* | 3/2022 | Wei | H04W 74/08 |
| 2022/0191939 | A1* | 6/2022 | Christoffersson | H04W 56/0045 |
| 2022/0330187 | A1* | 10/2022 | Cheng | G01S 19/256 |
| 2023/0284264 | A1* | 9/2023 | Kim | H04L 1/0003 370/329 |
| 2023/0354408 | A1* | 11/2023 | Jiang | G01S 5/0205 |

FOREIGN PATENT DOCUMENTS

| | | | | |
|---|---|---|---|---|
| CN | 111972030 | A | 11/2020 | |
| CN | 111972032 | A | 11/2020 | |
| CN | 113453343 | A | 9/2021 | |
| WO | 2018171524 | A1 | 9/2018 | |
| WO | 2020168331 | A1 | 8/2020 | |
| WO | WO-2020184954 | A1 * | 9/2020 | H04W 74/0833 |

OTHER PUBLICATIONS

Extended European Search Report issued in corresponding International Application No. 21900048.6, mailed Jan. 30, 2024, 10 pages.

QUALCOMM Incorporated: “Other Considerations for Two-Step RACH”, 3GPP Draft; R1-1912934, Nov. 2019, 5 pages.

International Search Report issued in corresponding International Application No. PCT/CN2021/134967, mailed Jan. 28, 2022, 4 pages.

ZTE, Sanechips, Report of Email Discussion [107#60] [NR/NTN] RACH capacity evaluation and procedures, 3GPP TSG-RAN WG2 Meeting #107bis, R2-1912664, Oct. 14-18, 2019, 29 pages.

QUALCOMM Incorporated, Other Considerations for Two-Step RACH, 3GPP TSG-RAN WG1 Meeting #98bis, R1-1911093, Oct. 14-20, 2019, 5 pages.

* cited by examiner

TWO-STEP RANDOM ACCESS METHOD AND APPARATUS, AND DEVICE

CROSS-REFERENCE TO RELATED APPLICATIONS

This application is a continuation of International Application No. PCT/CN2021/134967, filed on Dec. 2, 2021, which claims priority to Chinese Patent Application No. 202011408563.6 filed on Dec. 4, 2020. The entire contents of each of the above-referenced applications are expressly incorporated herein by reference.

TECHNICAL FIELD

This application pertains to the field of communication technologies, and in particular, to a random access method and apparatus and a device.

BACKGROUND

In current two-step random access, a terminal needs to determine a Random Access Channel (RACH) Occasion based on a cell, and send a Message (MSG) A.

However, in a cell free scenario, a system includes many wireless Access Point (APs). The terminal communicates with one or more adjacent APs, and when the terminal moves between APs, a serving AP of the terminal changes. In this way, an existing random access process is not applicable to cell free.

SUMMARY

Embodiments of this application provide a random access method and apparatus and a device.

According to a first aspect, an embodiment of this application provides a random access method, which is performed by a terminal and includes:

sending a message A in two-step random access; where the message A includes a preamble and a Physical Uplink Shared Channel (PUSCH); and at least one of related information of the preamble and related information of the PUSCH indicates location-related information of the terminal.

According to a second aspect, an embodiment of this application provides a random access method, which is performed by a network device and includes:

receiving a message A in two-step random access, where the message A includes a preamble and a PUSCH; and obtaining at least one of related information of the preamble and related information of the PUSCH; where at least one of the related information of the preamble and the related information of the PUSCH indicates location-related information of a terminal.

According to a third aspect, an embodiment of this application further provides a random access apparatus, including:

a first sending module, configured to send a message A in two-step random access; where the message A includes a preamble and a PUSCH; and at least one of related information of the preamble and related information of the PUSCH indicates location-related information of the terminal.

According to a fourth aspect, an embodiment of this application further provides a random access apparatus, including:

a second receiving module, configured to receive a message A in two-step random access, where the message A includes a preamble and a PUSCH; and an obtaining module, configured to obtain at least one of related information of the preamble and related information of the PUSCH; where at least one of the related information of the preamble and the related information of the PUSCH indicates location-related information of a terminal.

According to a fifth aspect, an embodiment of this application further provides a communication device. The communication device includes a processor, a memory, and a program or an instruction that is stored in the memory and that can run on the processor, and when the program or the instruction is executed by the processor, steps in the method described in the first aspect or the second aspect are implemented.

According to a sixth aspect, an embodiment of this application further provides a readable storage medium. The readable storage medium stores a program or an instruction, and when the program or the instruction is executed by the processor, steps in the method described in the first aspect or the second aspect are implemented.

According to a seventh aspect, an embodiment of this application provides a chip. The chip includes a processor and a communication interface, the communication interface is coupled to the processor, and the processor is configured to run a program or an instruction to implement the method described in the first aspect or the second aspect.

According to an eighth aspect, an embodiment of this application provides a computer program product. The program product is stored in a non-volatile storage medium, and the program is executed by at least one processor to implement steps in the method described in the first aspect or the second aspect.

According to a ninth aspect, an embodiment of this application provides a communication device, configured to perform steps in the method described in the first aspect, or configured to perform steps in the method described in the second aspect.

In this way, in the embodiments of this application, a message A that includes a preamble and a PUSCH in two-step random access is sent. Because at least one of related information of the preamble and related information of the PUSCH can indicate location-related information of a terminal, a network device may receive the message A, that is, receive the preamble and the PUSCH, and may further learn the location-related information of the terminal according to at least one of the related information of the preamble and the related information of the PUSCH, to determine sending-related information of a message B in two-step random access, so that random access in a cell free scenario can be implemented.

DETAILED DESCRIPTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

Terms "first" and "second" in the specification and claims of this application are used to distinguish between similar objects, and do not need to be used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and the character "/" generally represents an "or" relationship between associated objects.

It should be noted that the technology described in this application is not limited to a Long Term Evolution (LTE)/LTE-Advanced (LTE-A) system, and may also be used in various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application are often used interchangeably. The described technology may be used in the foregoing system and radio technology, and may also be used in another system and radio technology. A New Radio (NR) system is described below as an example, and the term NR is used in most of the descriptions, but these technologies can also be used in an application other than an application of the NR system, for example, a $6^{th}$ Generation (6G) communication system.

Figure 1:
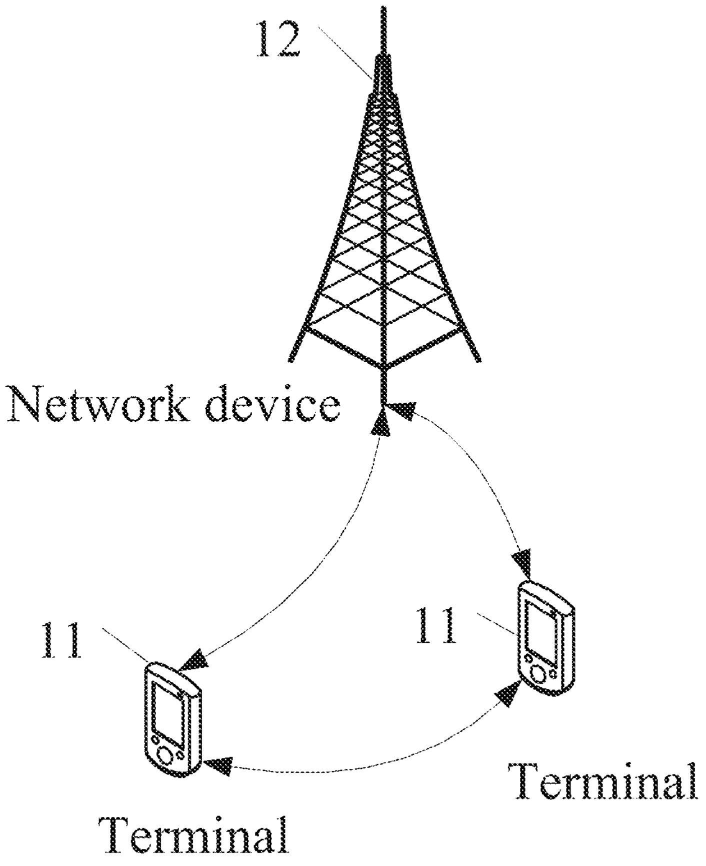
FIG. 1 is a structural diagram of a wireless communication system according to an embodiment of this application.

FIG. 1 is a block diagram of a wireless communication system according to an embodiment of this application. The wireless communication system includes a terminal 11 and a network device 12. The terminal 11 may also be referred to as a terminal device or a User Equipment (UE). The terminal 11 may be a terminal side device such as a mobile phone, a Tablet Personal Computer (TPC), a Laptop Computer (LC) or a notebook computer, a Personal Digital Assistant (PDA), a palmtop computer, a netbook, an Ultra-Mobile Personal Computer (UMPC), a Mobile Internet Device (MID), a wearable device or a Vehicle User Equipment (VUE), or a pedestrian User Equipment (PUE). The wearable device includes a band, a headset, eyeglasses, or the like. It should be noted that a specific type of the terminal 11 is not limited in this embodiment of this application. The network device 12 may be a base station or a core network. The base station may be referred to as a NodeB, an evolved Node B, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a Wireless Local Area Network (WLAN) access point, a WiFi node, a Transmission and Reception Point (TRP), or another suitable term in the field provided that a same technical effect is achieved. The base station is not limited to a specific technical term. It should be noted that, in this application, only a base station in an NR system is used as an example, but a specific type of the base station is not limited.

With reference to the accompanying drawings, a random access method provided in embodiments of this application is described in detail below by using a specific embodiment and an application scenario thereof.

The method in the embodiments of this application is performed by a terminal. The terminal, such as user equipment, may be an access terminal, a subscriber unit, a subscriber station, a mobile station, a mobile console, a remote station, a remote terminal, a mobile device, a user terminal, a wireless communication device, a user agent, or a user apparatus. In some alternative embodiments, the terminal device may be a cellular phone, a cordless phone, a Session Initiation Protocol (SIP) phone, a Wireless Local Loop (WLL) station, a PDA, a handheld device with a wireless communication function, a computing device, another processing device connected to a wireless modem, an in-vehicle device, or a wearable device.

Figure 2:
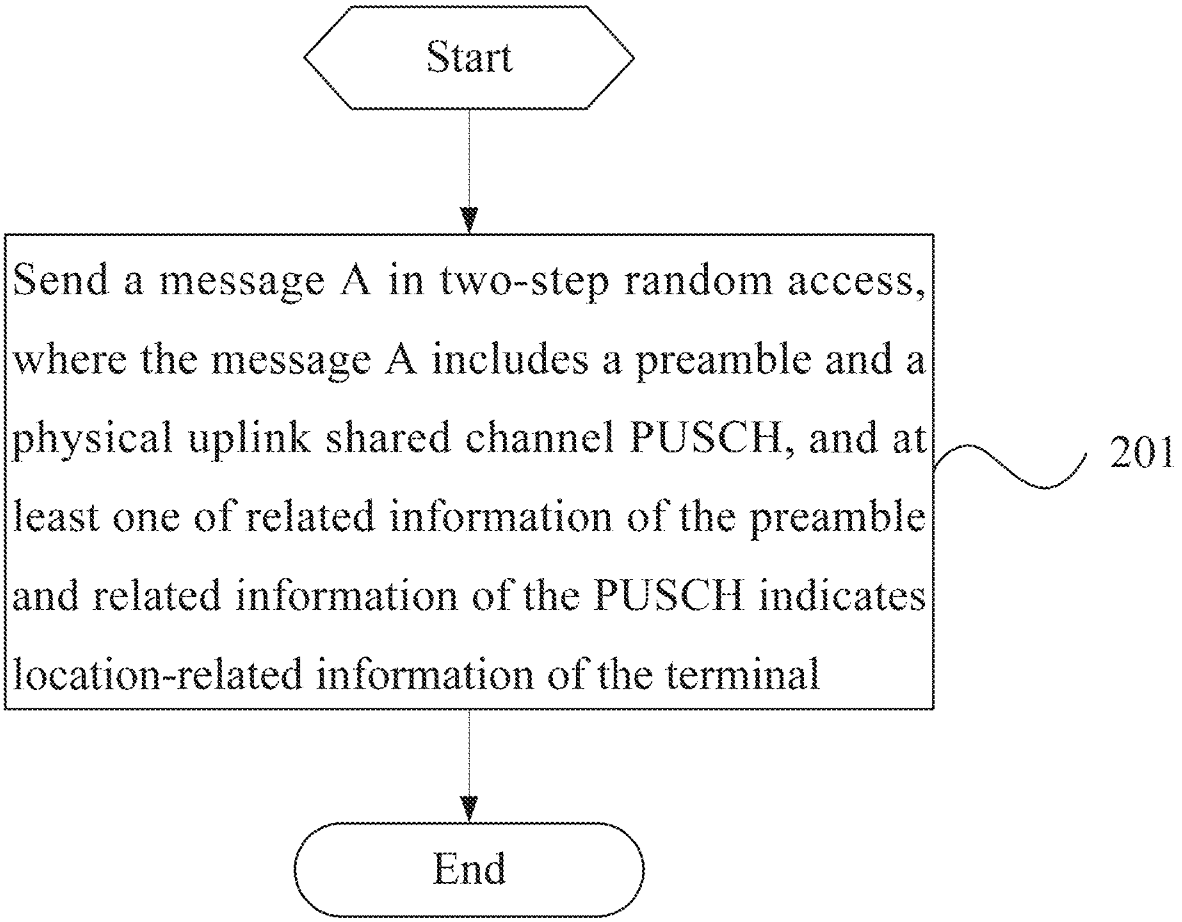
FIG. 2 is a first schematic flowchart of a random access method according to an embodiment of this application.

As shown in FIG. 2, a random access method in this embodiment of this application is performed by a terminal and includes the following steps:

Step 201: Send a message A in two-step random access.

The message A includes a preamble and a PUSCH.

At least one of related information of the preamble and related information of the PUSCH indicates location-related information of the terminal.

In this way, the terminal performs step 201, to send the message A that includes the preamble and the PUSCH in two-step random access. Because at least one of the related information of the preamble and the related information of the PUSCH can indicate the location-related information of the terminal, a network device may receive the message A, that is, receive the preamble and the PUSCH, and may further learn the location-related information of the terminal according to at least one of the related information of the preamble and the related information of the PUSCH, to determine sending-related information of a message B in two-step random access, so that random access in a cell free scenario can be implemented.

In addition, the sending-related information of the message B determined according to the location-related information reduces potential inter-AP interference and improves received signal quality of the message B.

The PUSCH included in the message A is a message carried on the PUSCH.

It should be learned that a node that receives the MSG A, a node that determines the sending-related information of the Message B (MSG B), and a node that sends the message B may be a same node, or may be different nodes. Details are not described herein again.

In this embodiment, the at least one of the related information of the preamble and the related information of the PUSCH indicates the location-related information of the terminal. For example, the related information of the preamble may independently indicate the location-related information of the terminal, the related information of the PUSCH may independently indicate the location-related information of the terminal, or the location-related information of the preamble and the related information of the PUSCH jointly indicate the location-related information of the terminal. In addition, the indication of the location-related information of the terminal may be an explicit indication of the location-related information of the terminal, or may be an implicit indication by using a mapping relationship. The mapping relationship may be predefined or configured by a base station. In some alternative embodiments, some parameters of the mapping relationship are configured by the base station, and a related rule or a calculation formula of the mapping relationship is predefined.

In some embodiments, the related information of the preamble includes at least one of the following:

sequence information;

time domain resource information; and frequency domain resource information.

Herein, the preamble sequence information includes information such as a sequence identifier (preamble index (ID)), a sequence length, a root sequence, a scrambling sequence, an initialization sequence, a Subcarrier Spacing (SCS), a cyclic shift of a sequence, or an orthogonal cover code. One or more of the foregoing information may indicate the location-related information or some location-related information of the terminal by using a preset mapping relationship.

The preamble index is associated with a sequence format (for example, at least one of a sequence length, an SCS, or a root sequence). An association relationship is predefined or is configured by the base station; or some related parameters of the association relationship are configured by the base station, and a related rule or a calculation formula of the association relationship is predefined.

In some embodiments, the related information of the PUSCH includes at least one of the following:

bit information carried on the PUSCH;

demodulation reference signal-related information of the PUSCH;

time domain resource information of the PUSCH; and frequency domain resource information of the PUSCH.

One or more of the foregoing information may indicate the location-related information or some location-related information of the terminal by using a preset mapping relationship. In addition, the bit information carried on the PUSCH may also be location-related information or some location-related information of the terminal, to implement an explicit indication. Herein, the demodulation reference signal-related information may be information such as a scrambling sequence and a resource of a Demodulation Reference Signal (DMRS).

In some embodiments, in a case that the related information of the preamble and the related information of the PUSCH jointly indicate the location-related information of the terminal, the related information of the preamble indicates first information of the location-related information, and the related information of the PUSCH indicates second information of the location-related information.

For example, a first mapping relationship defines a correspondence between the first information (for example, indicates a first-type location in a location area) of the location-related information and the related information of the preamble, as shown in Table 1.

TABLE 1

| Location information of UE | Related information of a preamble |
|---|---|
| First-type location 1 | {preamble index, preamble time domain resource, preamble frequency domain resource} combination 1 |
| First-type location 2 | {preamble index, preamble time domain resource, preamble frequency domain resource} combination 2 |
| First-type location 3 | {preamble index, preamble time domain resource, preamble frequency domain resource} combination 3 |
| First-type location 4 | {preamble index, preamble time domain resource, preamble frequency domain resource} combination 4 |

In some embodiments, each {preamble index, preamble time domain resource, preamble frequency domain resource} combination may include multiple value combinations of preamble index, preamble time domain resource, and preamble frequency domain resource.

A second mapping relationship defines a correspondence between the second information (for example, indicates a second-type location in the location area) of the location-related information and the related information of the PUSCH. The second information is the other part of the location-related information, indicating a location that is finer than the first information. For example, the first-type location 1 includes four second-type locations: locations 1-1, 1-2, 1-3, and 1-4 that are indicated by using 2 bits carried by the PUSCH. Therefore, the network device can determine the location-related information of the terminal according to the first-type location indicated by the related information of the preamble and the second-type location indicated by the related information of the PUSCH. For example, the base station finally determines, according to the detected first-type location 1 indicated by the related information of the preamble and the second-type location indicated by the 2 bits carried by the PUSCH, that the location information of the terminal is the location 1-2.

In some embodiments, the location-related information includes at least one of the following:

location information; and a measurement related to a location.

Herein, the location information is complete location information, and may be implemented as a two-dimensional raster (a raster 301 shown in FIG. 3) in two-dimensional coordinates based on an origin or a three-dimensional raster in three-dimensional coordinates, a sub-area in polar coordinates based on the origin, absolute longitude and latitude information, relative location information relative to a reference point or previously reported location information, location change and location area change indication information, or location quality information.

A format of the location information (such as a size of a raster, a size of a sub-area in polar coordinates, and the selection of the origin) is sent by the base station to the terminal, or is predefined (such as being predefined in a protocol).

Figure 3:
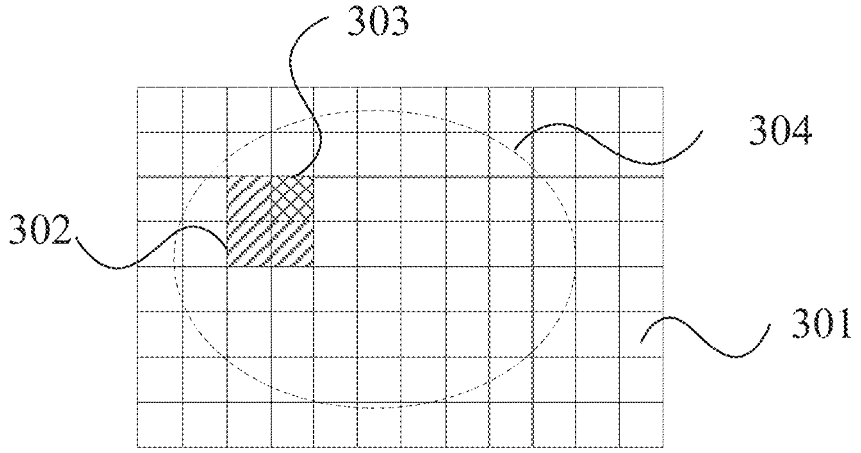
FIG. 3 is a schematic diagram of a location of a terminal according to an embodiment of this application.

For a manner in which the location-related information of the terminal is jointly indicated, a two-dimensional coordinate raster diagram shown in FIG. 3 is used as an example. The first-type location indicated by the related information of the preamble is an area including A rasters (for example, an area 302 of four rasters), and the second-type location indicated by the related information of the PUSCH includes an area 303 of B rasters (for example, an area 303 of one raster), where A>B. The area 302 is located in a network coverage area 304.

However, the measurement related to the location is incomplete location information, and the network device needs to synthetically obtain complete location information of the terminal with reference to other information (for example, a location of the network device). Location-related measurements include angles of arrival (and beam information) of different signals, Reference Signal Received Power (RSRP), for example, RSRP of different signals, a delay between different signals, and the like.

It is known from the foregoing content that at least one of the related information of the preamble or the related information of the PUSCH in the message A needs to indicate the location-related information of the terminal. Therefore, in this embodiment, before step 201, the method further includes:

measuring N1 first measurement signals to determine the location-related information of the terminal; and determining at least one of the following according to the location-related information:

the related information of the preamble; and the related information of the PUSCH; where the N1 first measurement signals are sent by at least one first node, and N1 is an integer greater than or equal to 1.

Herein, the first measurement signal may be at least one of a downlink reference signal and a synchronization signal. In this case, the N1 first measurement signals may be N1 downlink reference signals, may be N1 synchronization signals, or may be M downlink reference signals and K synchronization signals, where M+K=N1, and M and K are integers greater than or equal to 0.

The downlink reference signal includes at least one of a Channel State Information Reference Signal (CSI-RS) and a Tracking Reference Signal (TRS). The downlink signal may also be another downlink reference signal except the foregoing signal, which is not listed one by one herein. The synchronization signal includes but is not limited to a Synchronization Signal/Physical Broadcast Channel Signal Block (Synchronization Signal Mid PBCH Block (SSB)).

In some embodiments, the N1 first measurement signals meet at least one of the following:

signals of a same cell or signals of different cells;

being sent by different AP/TRPs (for example, N1 SSBs are associated with different AP/TRP(s));

different synchronization rasters (sync rasters) (for example, sync rasters of SSBs);

different frequency domain resources (for example, carriers or Resource Blocks (RBs)) and/or time domain resources; and different sequence formats.

In addition, for the N1 first measurement signals obtained through measurement, signal parameters of the N1 first measurement signals are greater than or equal to a first threshold, and/or a difference between signal parameters of the m first measurement signals is less than or equal to a second threshold. Herein, the signal parameter includes at least one of RSRP, a Signal to Interference plus Noise Ratio (SINR), and Reference Signal Received Quality (RSRQ). The first threshold and the second threshold are notified by the network device to the terminal by using a system message.

In some embodiments, determining the location-related information of the terminal based on the N1 first measurement signals may be implemented by using one or more implementations in a Global Navigation Satellite System (GNSS), Radio Frequency Identification (RFID), an Ultra Wide Band (UWB), Bluetooth, a wireless local area network Wi-Fi, a network-based positioning technology, or another positioning technology.

After the location-related information of the terminal is determined, at least one of the related information of the preamble and the related information of the PUSCH may be further determined according to the location-related information.

An implementation of determining at least one of the related information of the preamble and the related information of the PUSCH according to the location-related information may be implemented by using at least one of the related information of the preamble and the related information of the PUSCH to indicate reverse processing of the location-related information of the terminal.

For example, if the related information of the preamble and the related information of the PUSCH jointly indicate the location-related information of the terminal, the related information of the preamble may be determined by using the first-type location in the location-related information, and 2-bit information carried by the PUSCH is determined according to the second-type location in the location-related information. In this way, if the location information of the terminal is the location 1-2, the first-type location 1 may determine the related information of the preamble by using Table 1, and the 2-bit information carried by the PUSCH is determined according to the second-type location 1-2.

In addition, because each {preamble index, preamble time domain resource, preamble frequency domain resource} combination may include multiple value combinations of preamble index, preamble time domain resource, and preamble frequency domain resource, the terminal may select one {preamble index, preamble time domain resource, preamble frequency domain resource} value combination as the related information of the preamble in the message A. For example, selection manners include:

Manner 1: The terminal first determines, according to the location-related information, an RO associated with the location-related information, and then selects one preamble from all preambles of the RO, for example, randomly selects one preamble, where RO is a time domain resource and a frequency domain resource used for transmitting one MSG 1.

Manner 2: The terminal determines an RO associated with the location-related information and determines a preamble candidate set, and then selects one preamble from the preamble candidate set, for example, randomly selects one preamble.

In addition, for a case in which the related information of the PUSCH independently indicates the location-related information of the terminal, the related information of the preamble is not associated with the location-related information of the terminal. In some embodiments, before the sending a message A in two-step random access, the method further includes:

measuring N2 first measurement signals to determine the related information of the preamble, where the N2 first measurement signals are sent by at least one first node, and N2 is an integer greater than or equal to 1.

Herein, N2 may be equal to or not equal to N1.

In some embodiments, the N2 first measurement signals meet at least one of the following:

different sync rasters (for example, sync rasters of SSBs);

different frequency domain resources (for example, carriers or RBs) and/or time domain resources;

different sequence formats; and being sent by a same AP/TRP or different AP/TRPs (for example, N2 SSBs are associated with different AP/TRP(s)).

In addition, for the N2 first measurement signals obtained through measurement, signal parameters of the N2 first measurement signals are greater than or equal to a first threshold, and/or a difference between signal parameters of the N2 first measurement signals is less than or equal to a second threshold. Herein, the signal parameter includes at least one of RSRP, an SINR, and RSRQ. The first threshold and the second threshold are notified by the network device to the terminal by using a system message.

For example, the related information of the preamble may be according to the N2 first measurement signals based on an association between the N2 first measurement signals and the related information of the preamble. For example, a third mapping relationship defines a correspondence between the related information of the preamble and N2 SSBs, as shown in Table 2.

TABLE 2

| SSB information | Related information of a preamble |
|---|---|
| SSB 1, SSB 2 | {preamble index, preamble time domain resource, preamble frequency domain resource} combination 1 |
| SSB 2, SSB 3 | {preamble index, preamble time domain resource, preamble frequency domain resource} combination 2 |
| SSB 1, SSB 3 | {preamble index, preamble time domain resource, preamble frequency domain resource} combination 3 |
| SSB 2, SSB 3, SSB 1 | {preamble index, preamble time domain resource, preamble frequency domain resource} combination 4 |
| SSB 1 | {preamble index, preamble time domain resource, preamble frequency domain resource} combination 5 |
| SSB 2 | {preamble index, preamble time domain resource, preamble frequency domain resource} combination 6 |
| SSB 3 | {preamble index, preamble time domain resource, preamble frequency domain resource} combination 7 |

Each (preamble index, preamble time domain resource, preamble frequency domain resource) combination may include multiple value combinations of preamble index, preamble time domain resource, and preamble frequency domain resource. UE may select and send one {preamble index, preamble time domain resource, preamble frequency domain resource} value combination. For example, selection manners include:

Method 1: The terminal first determines an RO associated with the N2 first measurement signals, and then selects one preamble from all preambles of the RO, for example, randomly selects one preamble.

Manner 2: The terminal determines an RO associated with the N2 first measurement signals and determines a preamble candidate set, and then selects one preamble from the preamble candidate set, for example, randomly selects one preamble.

In this embodiment, after determining the related information of the preamble, the terminal can further determine, according to the related information of the preamble, the related information of the PUSCH and related information of a DMRS that are associated, and send the PUSCH in the MSG A. For example, after selecting an RO and a preamble index of the RO, the UE finds, by using a predefined mapping rule, a corresponding PO and DMRS resource that are used to transmit the PUSCH.

Generally, a message is sent based on transmit power and a transmit carrier. Therefore, for example, before step 201, the method further includes:

measuring the N3 first measurement signals to determine at least one of transmit power of the message A and a transmit carrier, where the N3 first measurement signals are sent by at least one first node, and N3 is an integer greater than or equal to 1; and the sending a message A in two-step random access includes:

sending the message A according to at least one of the transmit power of the message A and the transmit carrier.

Herein, N3 may be equal to or may be different from N1 or N2. In this case, the N3 first measurement signals are used for determining at least one of the transmit power of the message A and the transmit carrier.

In some embodiments, the determining the transmit power of the message A includes:

separately determining N3 path loss values by using receive power of the N3 first measurement signals; and determining the transmit power of the message A according to the N3 path loss values.

For example, the first measurement signal is an SSB, and RSRP of multiple SSBs associated with the MSG A are considered. For example, the multiple SSBs are sent by using multiple APs, and transmit power of the MSG A is determined based on path losses from the multiple APs to the terminal.

In some embodiments, the determining the transmit power of the message A according to the N3 path loss values is: summing up path loss values of N3 SSBs to obtain a sum, and then obtaining a target path loss value by performing log on the sum by using 10 as a base, and then calculating the transmit power of the MSG A according to the target path loss value.

In addition, if the MSG A is retransmitted, transmit power of the retransmission is raised according to a quantity of retransmission times. If an SSB index is changed during retransmission of the MSG A, power is raised.

The transmit carrier may be selected from may be selected from multiple uplink carriers that are configured by the base station for the terminal to send the MSG A by using signal parameters of the N3 first measurement signals. It is assumed that the terminal is configured with a high frequency carrier and a low frequency carrier by the base station to send the MSG A. If RSRP, SINR, and RSRQ of the N3 first measurement signals are all less than a corresponding threshold, the terminal sends the MSG A by using a target carrier (for example, a carrier with a lower frequency), or otherwise, sends the MSG A by using another carrier (for example, a carrier with a higher frequency).

Based on the determined transmit carrier of the MSGA, a Random Access-Radio Network Temporary Identity (RA-RNTI) may be further determined. A calculation formula of the RA-RNTI is related to a carrier that is used to send the MSG A, for example, is related to a carrier ID.

For the beam-related information for sending the MSG A, if the beam is a millimeter wave (FR2), the MSG A needs to be separately sent to two TRP/APs by using two beams of one panel or two beams of two panels.

In this embodiment, for example, the terminal measures one or more first measurement signals, and may further determine beam-related information for sending the preamble.

In some embodiments, the terminal measures one or more first measurement signals, and may further determine related information of one or more preambles and the related information of the PUSCH, and send one or more MSGs A.

In some embodiments, the terminal measures one or more first measurement signals, and determines, by using measured RSRP values, that random access is performed by using a two-step RACH or a four-step RACH, that is, determines a preamble for sending an MSG 1 or the MSG A. For example, if Q (Q is an integer greater than or equal to 1) first measurement signals obtained through measurement meet a first condition, for example, all Q RSRPs are greater than a third threshold, or a sum of Q RSRPs is greater than a fourth threshold, the preamble of the MSG A is sent, or otherwise, the MSG 1 is sent.

After the terminal sends the message A, the network device that receives the message A can determine sending-related information of a message B based on at least one of the related information of the preamble and the related information of the PUSCH, and send the message B. For the sent message B, for example, after step 201, the method further includes:

receiving a message B in two-step random access that is sent by at least one first node; where sending-related information of the message B is associated with at least one of the related information of the preamble and the related information of the PUSCH; and the sending-related information of the message B includes at least one of the following:

identifier information of the at least one first node; and beam-related information for sending the message B.

Herein, the beam-related information includes a direction of a beam, Quasi Co-Location (QCL) information. Transmission Configuration Index (TCI) state information, and the like.

It is known in the foregoing content that at least one of the related information of the preamble and the related information of the PUSCH indicates location information of the terminal. The network device determines, based on the preamble and the PUSCH that are in the received message A and the location information of the terminal that is indicated by at least one of the related information of the preamble and the related information of the PUSCH, the sending-related information of the message B. Herein, a correspondence between the location-related information and the sending-related information of the message B is predefined or configured.

For example, a fourth mapping relationship defines a correspondence between the location-related information of the terminal and beam-related information of the message B, as shown in Table 3.

TABLE 3

| Location information of UE | Beam information |
|---|---|
| Location 1 | Beam 1 of a cell 1 (for example, QCL of an SSB 1) |
| Location 2 | Beam 2 of a cell 1 (for example, QCL of an SSB 2) |
| Location 3 | Beam 3 of a cell 1 (for example, QCL of an SSB 3) |
| Location 4 | Beam 4 of a cell 1 (for example, QCL of an SSB 4) |

A fifth mapping relationship defines a correspondence (cell free) between the location-related information of the terminal and an identifier of a node that sends the message B, as shown in Table 4.

TABLE 4

| Location information of UE | AP/TRP information |
|---|---|
| Location 1 | AP/TRP 1 |
| Location 2 | AP/TRP 1, AP/TRP 2 |
| Location 3 | AP/TRP 2 |
| Location 4 | AP/TRP 3 |

A sixth mapping relationship defines a correspondence (cell free) between the location-related information of the terminal and an identifier of a node that sends the message B/the beam-located information, as shown in Table 5.

TABLE 5

| Location information of UE | AP/beam information |
|---|---|
| Location 1 | Beam A of an AP 1 |
| Location 2 | Beam B of an AP 1 and an AP 2 (where the beam B is sent jointly by the AP 1 and the AP 2) |
| Location 3 | Beam C of an AP 2 |
| Location 4 | Beam D of an AP 3 and beam E of an AP 4 (where the beam D and the beam E are separately sent by the AP 3 and the AP 4) |

In this way, after further determining the sending-related information of the message B based on the location-related information of the terminal that is indicated by at least one of the related information of the preamble and the related information of the PUSCH, the network device sends the message B according to the at least one item in the sending-related information.

In addition, in this embodiment of this application, for example, the method further includes:

sending a first reference signal associated with a terminal identifier; and receiving a message B in two-step random access that is sent by at least one first node; where sending-related information of the message B is associated with location-related information determined by using the first reference signal; and the sending-related information of the message B includes at least one of the following:

identifier information of the at least one first node; and beam-related information for sending the message B.

Herein, that the terminal sends the first reference signal is that after receiving the first reference signal, the network device may determine the location-related information of the terminal based on the first reference signal, to determine the sending-related information of the message B. Herein, a correspondence between the location-related information and the sending-related information of the message B is predefined or configured. A specific manner thereof is the same as an implementation of the location information of the terminal that is indicated by at least one of the related information of the preamble and the related information of the PUSCH and the sending-related information of the message B. Details are not described herein again.

The first reference signal may be a Sounding Reference Signal (SRS).

In some embodiments, the first reference signal is sent before or after the PUSCH, or on at least one symbol in a slot in which the PUSCH is located.

For example, in this embodiment, the method further includes:

receiving N4 second measurement signals, where the N4 second measurement signals are sent by the at least one first node, and N4 is an integer greater than or equal to 1; and receiving the message B according to beam-related information of the N4 second measurement signals.

In other words, to ensure that the terminal receives the message B, before sending the message B, the network device sends the N4 second measurement signals by using at least one first node, to help the terminal receive the MSG B. After receiving the N4 second measurement signals, the terminal may receive the message B according to the beam-related information of the N4 second measurement signals.

In some embodiments, the terminal assumes that a DMRS of the MSG B is quasi-co-located with the detected second measurement signal, and the terminal assumes that the DMRS of the MSG B is quasi-co-located with a second measurement signal with a strongest signal parameter.

Herein, the second measurement signal includes at least one of a synchronization signal and a TRS. The N4 second measurement signals may be N4 TRSs, may be N4 synchronization signals, or may be E TRSs and F synchronization signals, where E+F=N4, and E and F are integers greater than or equal to 0.

In addition, because the network device can further send related information of multiple nodes, to receive the first measurement signal and/or the second measurement signal, correspondingly, the method further includes:

receiving related information of multiple nodes; where the related information of the multiple nodes includes at least one of the following:

identifiers of the multiple nodes;

locations of the multiple nodes;

information about synchronization signals or reference signals associated with the multiple nodes; and random access resource information associated with the multiple nodes.

Herein, the multiple nodes include at least one of a cell, a TRP, and an AP. Identifiers of the multiple nodes may be node IDs, locations of the multiple nodes may be encrypted, information about a synchronization signal (SSB) or a reference signal (CSI-RS, TRS) associated with the multiple nodes includes sequence information of the signal, a time-frequency resource of the signal, and the like. In a cell free scenario, random access resource information associated with multiple nodes is information about a shared RACH resource corresponding to the multiple nodes.

The related information of the multiple nodes is sent by the network device by using signaling (for example, SIB signaling), and the SIB is a SIB sent by a node or a SIB sent by using a Single-Frequency Network (SFN). The network device may further broadcast information about multiple frequencies of a RACH resource by using the SIB, and the terminal may select one frequency from the corresponding multiple frequencies for RACH transmission, for example, select one frequency for RACH transmission according to a measured SSB RSRP size.

Figure 4:
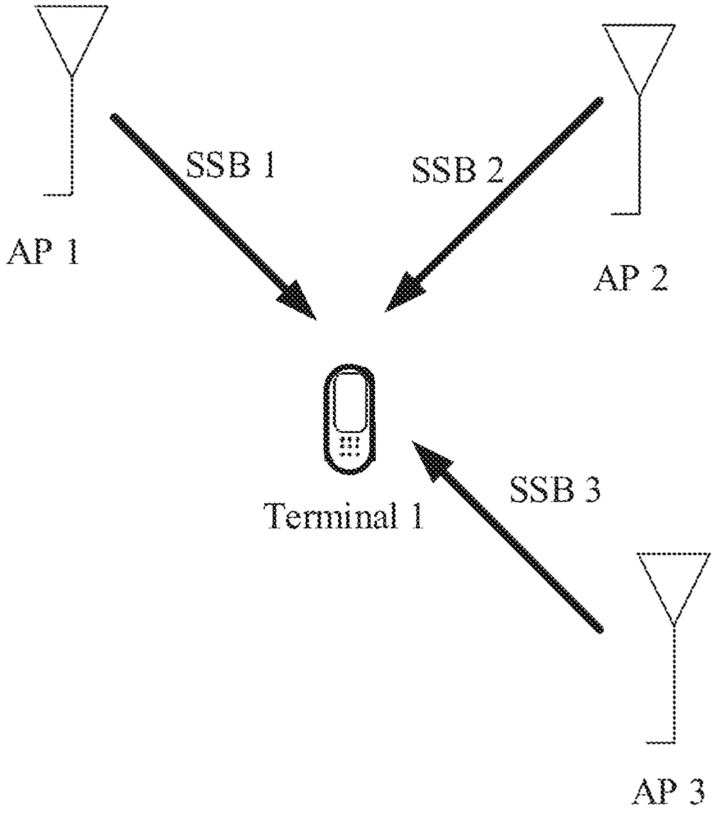
FIG. 4 is a structural diagram of a node communication system according to an embodiment of this application.

In conclusion, the method in this embodiment of this application may be applied to the scenario shown in FIG. 4. A terminal 1 determines location-related information of the terminal 1 by receiving an SSB 1 sent by an AP 1, an SSB 2 sent by an AP 2, and an SSB 3 sent by an AP 3. Then, if at least one of the related information of the preamble and the related information of the PUSCH is determined according to the location-related information, the terminal 1 may determine the message A and send the message A. In a case that the related information of the preamble is not associated with the location-related information, the SSB 1, the SSB 2, and the SSB 3 may be further used to determine the related information of the preamble. The SSB 1, the SSB 2, and the SSB 3 may be further used to determine at least one of the transmit power of the message A and the transmit carrier.

Figure 5:
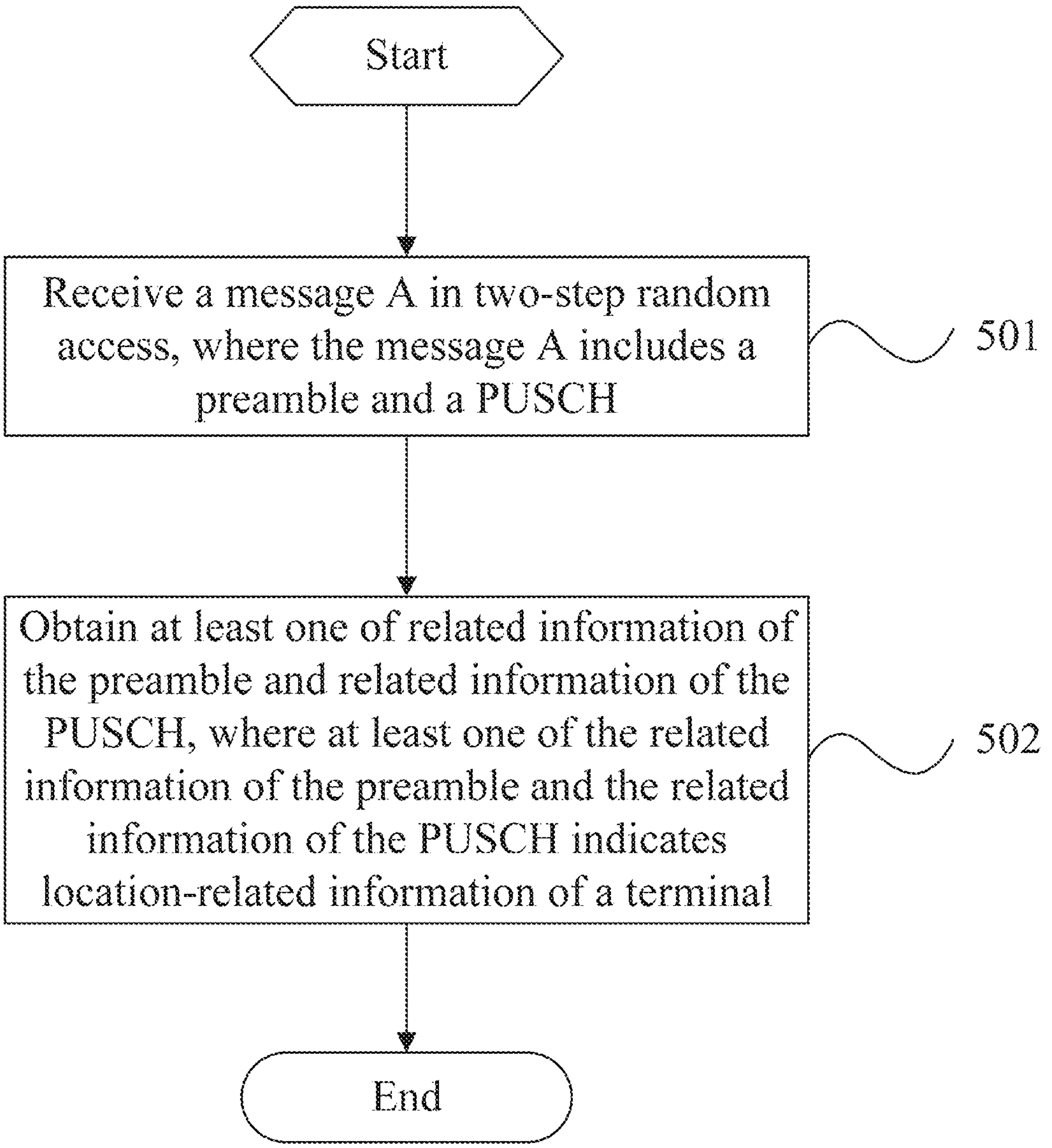
FIG. 5 is a second schematic flowchart of a random access method according to an embodiment of this application.

As shown in FIG. 5, a random access method in this embodiment of this application is performed by a network device and includes the following steps:

Step 501: Receive a message A in two-step random access, where the message A includes a preamble and a PUSCH.

Step 502: Obtain at least one of related information of the preamble and related information of the PUSCH.

At least one of the related information of the preamble and the related information of the PUSCH indicates location-related information of a terminal.

The message A includes the preamble and the PUSCH (that is, a message carried on the PUSCH). Because at least one of the related information of the preamble and the related information of the PUSCH can indicate the location-related information of the terminal, the network device receives the message A, that is, receives the preamble and the PUSCH, and may further learn the location-related information of the terminal according to at least one of the related information of the preamble and the related information of the PUSCH, to determine the sending-related information of a message B in two-step random access, so that random access in a cell free scenario can be implemented.

Herein, the network device may receive a message A forwarded by a first node as the first node or as a processing node.

In some embodiments, after the obtaining at least one of related information of the preamble and related information of the PUSCH, the method further includes:

determining sending-related information of a message B in two-step random access according to at least one of the related information of the preamble and the related information of the PUSCH; and sending the message B by using at least one first node according to the sending-related information of the message B; where the sending-related information of the message B is associated with at least one of the related information of the preamble and the related information of the PUSCH; and the sending-related information of the message B includes at least one of the following:

identifier information of the at least one first node; and beam-related information for sending the message B.

In some embodiments, in a case that the related information of the preamble and the related information of the PUSCH jointly indicate the location-related information of the terminal, the related information of the preamble indicates first information of the location-related information, and the related information of the PUSCH indicates second information of the location-related information.

In some embodiments, the method further includes:

sending N1 first measurement signals by using at least one first node, where the N1 first measurement signals are used to determine the location-related information of the terminal; where N1 is an integer greater than or equal to 1.

In some embodiments, the method further includes:

sending N2 first measurement signals by using at least one first node, where the N2 first measurement signals are used to determine the related information of the preamble; where N2 is an integer greater than or equal to 1.

In some embodiments, the related information of the preamble includes at least one of the following:

sequence information;

time domain resource information; and frequency domain resource information.

In some embodiments, the related information of the PUSCH includes at least one of the following:

bit information carried on the PUSCH;

demodulation reference signal-related information of the PUSCH;

time domain resource information of the PUSCH; and frequency domain resource information of the PUSCH.

In some embodiments, the location-related information includes at least one of the following:

location information; and a measurement related to a location.

In some embodiments, the method further includes:

sending N3 first measurement signals by using at least one first node, where the N3 first measurement signals are used to determine at least one of transmit power of the message A and a transmit carrier; where N3 is an integer greater than or equal to 1.

In some embodiments, the method further includes:

receiving a first reference signal associated with a terminal identifier; and determining sending-related information to of a message B in two-step random access according to the first reference signal; and sending the message B by using at least one first node according to the sending-related information of the message B; where the sending-related information of the message B includes at least one of the following:

identifier information of the at least one first node; and beam-related information for sending the message B.

In some embodiments, the first reference signal is sent before or after the PUSCH, or on at least one symbol in a slot in which the PUSCH is located.

In some embodiments, the method further includes:

sending N4 second measurement signals by using at least one first node, where the N4 second measurement signals are used to determine to beam-related information for receiving the message B; where the beam-related information for receiving the message B is beam-related information of the N4 second measurement signals, and N is an integer greater than or equal to 1.

In some embodiments, the method further includes:

sending related information of multiple nodes; where the related information of the multiple nodes includes at least one of the following: identifiers of the multiple nodes;

locations of the multiple nodes;

information about synchronization signals or reference signals associated with the multiple nodes; and random access resource information associated with the multiple nodes.

In some embodiments, the determining sending-related information of a message B in two-step random access according to at least one of the related information of the preamble and the related information of the PUSCH includes:

determining location-related information of the terminal according to at least one of the related information of the preamble and the related information of the PUSCH; and determining, according to the location-related information of the terminal, sending-related information associated with a location of the terminal; where the sending-related information associated with the location of the terminal is sending-related information of the message B.

It should be noted that the random access method provided in this embodiment of this application is implemented in cooperation with the foregoing method performed by the terminal. An implementation of the foregoing embodiment of the random access method performed by the terminal is applicable to the method, and a same technical effect can also be achieved.

The random access method provided in this embodiment of this application may be performed by a random access apparatus, or a control module that is in the random access apparatus and that is configured to perform and load the random access method. In this embodiment of this application, that the random access apparatus performs and loads the random access method is used as an example to describe the random access method provided in the embodiments of this application.

Figure 6:
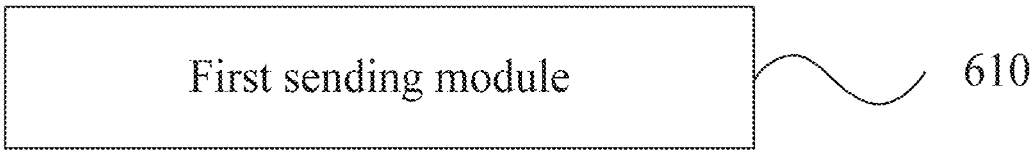
FIG. 6 is a structural diagram of an apparatus corresponding to FIG. 2 according to an embodiment of this application.

As shown in FIG. 6, a random access apparatus in this embodiment of this application includes:

a first sending module 610, configured to send a message A in two-step random access; where the message A includes a preamble and a physical uplink shared channel PUSCH; and at least one of related information of the preamble and related information of the PUSCH indicates location-related information of a terminal.

In some embodiments, the apparatus further includes:

a first receiving module, configured to receive a message B in two-step random access that is sent by at least one first node; where sending-related information of the message B is associated with at least one of the related information of the preamble and the related information of the PUSCH; and the sending-related information of the message B includes at least one of the following:

identifier information of the at least one first node; and beam-related information for sending the message B.

In some embodiments, in a case that the related information of the preamble and the related information of the PUSCH jointly indicate the location-related information of the terminal, the related information of the preamble indicates first information of the location-related information, and the related information of the PUSCH indicates second information of the location-related information.

In some embodiments, the apparatus further includes:

a first processing module, configured to measure N1 first measurement signals to determine the location-related information of the terminal; and a second processing module, configured to determine at least one of the following according to the location-related information:

the related information of the preamble; and the related information of the PUSCH; where the N1 first measurement signals are sent by at least one first node, and N1 is an integer greater than or equal to 1.

In some embodiments, the apparatus further includes:

a third processing module, configured to measure N2 first measurement signals to determine the related information of the preamble, where the N2 first measurement signals are sent by at least one first node, and N2 is an integer greater than or equal to 1.

In some embodiments, the related information of the preamble includes at least one of the following:

sequence information;

time domain resource information; and frequency domain resource information.

In some embodiments, the related information of the PUSCH includes at least one of the following:

bit information carried on the PUSCH;

demodulation reference signal-related information of the PUSCH;

time domain resource information of the PUSCH; and frequency domain resource information of the PUSCH.

In some embodiments, the location-related information includes at least one of the following:

location information; and a measurement related to a location.

In some embodiments, the apparatus further includes:

a fourth processing module, configured to measure the N3 first measurement signals to determine at least one of transmit power of the message A and a transmit carrier, where the N3 first measurement signals are sent by at least one first node, and N3 is an integer greater than or equal to 1; and the first sending module is further configured to:

send the message A according to at least one of the transmit power of the message A and the transmit carrier.

In some embodiments, the fourth processing module is further configured to:

separately determine N3 path loss values by using receive power of the N3 first measurement signals; and determine the transmit power of the message A according to the N3 path loss values.

In some embodiments, the apparatus further includes:

a reference signal sending module, configured to send a first reference signal associated with a terminal identifier; and a first message B receiving module, configured to receive a message B in two-step random access that is sent by at least one first node; where sending-related information of the message B is associated with location-related information determined by using the first reference signal; and the sending-related information of the message B includes at least one of the following:

identifier information of the at least one first node; and beam-related information for sending the message B.

In some embodiments, the first reference signal is sent before or after the PUSCH, or on at least one symbol in a slot in which the PUSCH is located.

In some embodiments, the apparatus further includes:

a signal receiving module, configured to receive N4 second measurement signals, where the N4 second measurement signals are sent by the at least one first node, and N4 is an integer greater than or equal to 1; and a second message B receiving module, configured to receive the message B according to beam-related information of the N4 second measurement signals.

In some embodiments, the apparatus further includes:

an information receiving module, configured to receive related information of multiple nodes; where the related information of the multiple nodes includes at least one of the following:

identifiers of the multiple nodes;

locations of the multiple nodes;

information about synchronization signals or reference signals associated with the multiple nodes; and random access resource information associated with the multiple nodes.

The apparatus sends the message A that includes the preamble and the PUSCH in two-step random access. Because at least one of the related information of the preamble and the related information of the PUSCH can indicate the location-related information of the terminal, a network device may receive the message A, that is, receive the preamble and the PUSCH, and may further learn the location-related information of the terminal according to at least one of the related information of the preamble and the related information of the PUSCH, to determine sending-related information of a message B in two-step random access, so that random access in a cell free scenario can be implemented.

The random access apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, a UMPC, a netbook, a PDA, or the like. The non-mobile electronic device may be a server, a Network Attached Storage (NAS), a Personal Computer (PC), a Television (TV), a counter, or a self-service computer. This is not specifically limited in this embodiment of this application.

The random access apparatus in this embodiment of this application may be an apparatus with an operating system. The operating system may be an Android operating system, may be an iOS operating system, or may be another possible operating system. This is not specifically limited in this embodiment of this application.

The random access apparatus provided in this embodiment of this application can implement processes implemented by the terminal in the method embodiments of FIG. 2 to FIG. 3. To avoid repetition, details are not described herein again.

Figure 7:
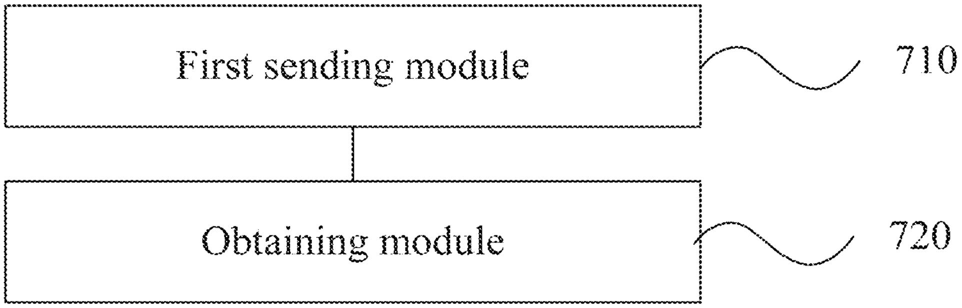
FIG. 7 is a structural diagram of an apparatus corresponding to FIG. 5 according to an embodiment of this application.

As shown in FIG. 7, a random access apparatus in this embodiment of this application includes:

a second receiving module 710, configured to receive a message Ain two-step random access, where the message A includes a preamble and a PUSCH; and an obtaining module 720, configured to obtain at least one of related information of the preamble and related information of the PUSCH; where at least one of the related information of the preamble and the related information of the PUSCH indicates location-related information of a terminal.

In some embodiments, the apparatus further includes:

a first determining module, configured to determine sending-related information of a message B in two-step random access according to at least one of the related information of the preamble and the related information of the PUSCH; and a second sending module, configured to send the message B by using at least one first node according to the sending-related information of the message B; where the sending-related information of the message B is associated with at least one of the related information of the preamble and the related information of the PUSCH; and the sending-related information of the message B includes at least one of the following:

identifier information of the at least one first node; and beam-related information for sending the message B.

In some embodiments, in a case that the related information of the preamble and the related information of the PUSCH jointly indicate the location-related information of the terminal, the related information of the preamble indicates first information of the location-related information, and the related information of the PUSCH indicates second information of the location-related information.

In some embodiments, the apparatus further includes:

a first communication module, configured to send N1 first measurement signals by using at least one first node, where the N1 first measurement signals are used to determine the location-related information of the terminal; where N1 is an integer greater than or equal to 1.

In some embodiments, the apparatus further includes:

a second communication module, configured to send N2 first measurement signals by using at least one first node, where the N2 first measurement signals are used to determine the related information of the preamble; where N2 is an integer greater than or equal to 1.

In some embodiments, the related information of the preamble includes at least one of the following:

sequence information;

time domain resource information; and frequency domain resource information.

In some embodiments, the related information of the PUSCH includes at least one of the following:

bit information carried on the PUSCH;

demodulation reference signal-related information of the PUSCH;

time domain resource information of the PUSCH; and frequency domain resource information of the PUSCH.

In some embodiments, the location-related information includes at least one of the following:

location information; and a measurement related to a location.

In some embodiments, the apparatus further includes:

a third communication module, configured to send N3 first measurement signals by using at least one first node, where the N3 first measurement signals are used to determine at least one of transmit power of the message A and a transmit carrier; where N3 is an integer greater than or equal to 1.

In some embodiments, the apparatus further includes:

a third receiving module, configured to receive a first reference signal associated with a terminal identifier;

a second determining module, configured to determine sending-related information to of a message B in two-step random access according to the first reference signal; and a third sending module, configured to send the message B by using at least one first node according to the sending-related information of the message B; where the sending-related information of the message B includes at least one of the following:

identifier information of the at least one first node; and beam-related information for sending the message B.

In some embodiments, the first reference signal is sent before or after the PUSCH, or on at least one symbol in a slot in which the PUSCH is located.

In some embodiments, the apparatus further includes:

a fourth communication module, configured to send N4 second measurement signals by using at least one first node, where the N4 second measurement signals are used to determine to beam-related information for receiving the message B; where the beam-related information for receiving the message B is beam-related information of the N4 second measurement signals, and N is an integer greater than or equal to 1.

In some embodiments, the apparatus further includes:

a fourth sending module, configured to send related information of multiple nodes; where the related information of the multiple nodes includes at least one of the following:

identifiers of the multiple nodes;

locations of the multiple nodes;

information about synchronization signals or reference signals associated with the multiple nodes; and random access resource information associated with the multiple nodes.

In some embodiments, the first determining module is further configured to:

determine location-related information of the terminal according to at least one of the related information of the preamble and the related information of the PUSCH; and determine, according to the location-related information of the terminal, sending-related information associated with a location of the terminal, where the sending-related information associated with the location of the terminal is sending-related information of the message B.

The apparatus receives the message A, and the message A includes the preamble and the PUSCH. Because at least one of the related information of the preamble and the related information of the PUSCH can indicate the location-related information of the terminal, the apparatus may further learn the location-related information of the terminal according to at least one of the related information of the preamble and the related information of the PUSCH, to determine the sending-related information of the message B in two-step random access, so that random access in a cell free scenario can be implemented.

The random access apparatus in this embodiment of this application may be an apparatus, or may be a component, an integrated circuit, or a chip in a network device. The apparatus may be a base station, and this embodiment of this application sets no specific limitation.

The random access apparatus provided in this embodiment of this application can implement processes implemented by the network device in the method embodiments of FIG. 5. To avoid repetition, details are not described herein again.

Figure 8:
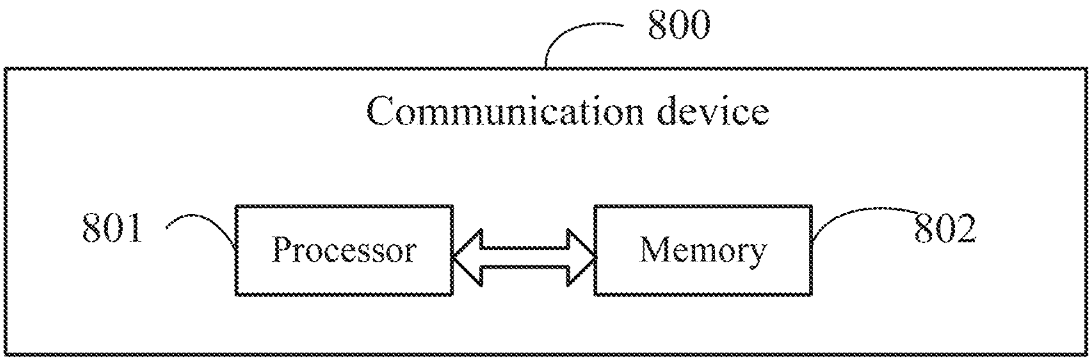
FIG. 8 is a structural diagram of a communication device according to an embodiment of this application.

In some embodiments, as shown in FIG. 8, an embodiment of this application further provides a communication device, including a processor 801, a memory 802, and a program or an instruction that is stored in the memory 802 and that can run on the processor 801. For example, when the communication device 800 is a terminal, the program or the instruction is executed by the processor 801 to implement processes of the embodiment of the foregoing random access method performed by the terminal, and a same technical effect can be achieved. When the communication device 800 is a network side device, when the program or the instruction is executed by the processor 801, processes of the embodiment of the foregoing random access method performed by the network device are implemented, and a same technical effect can be achieved. To avoid repetition, details are not described herein again.

Figure 9:
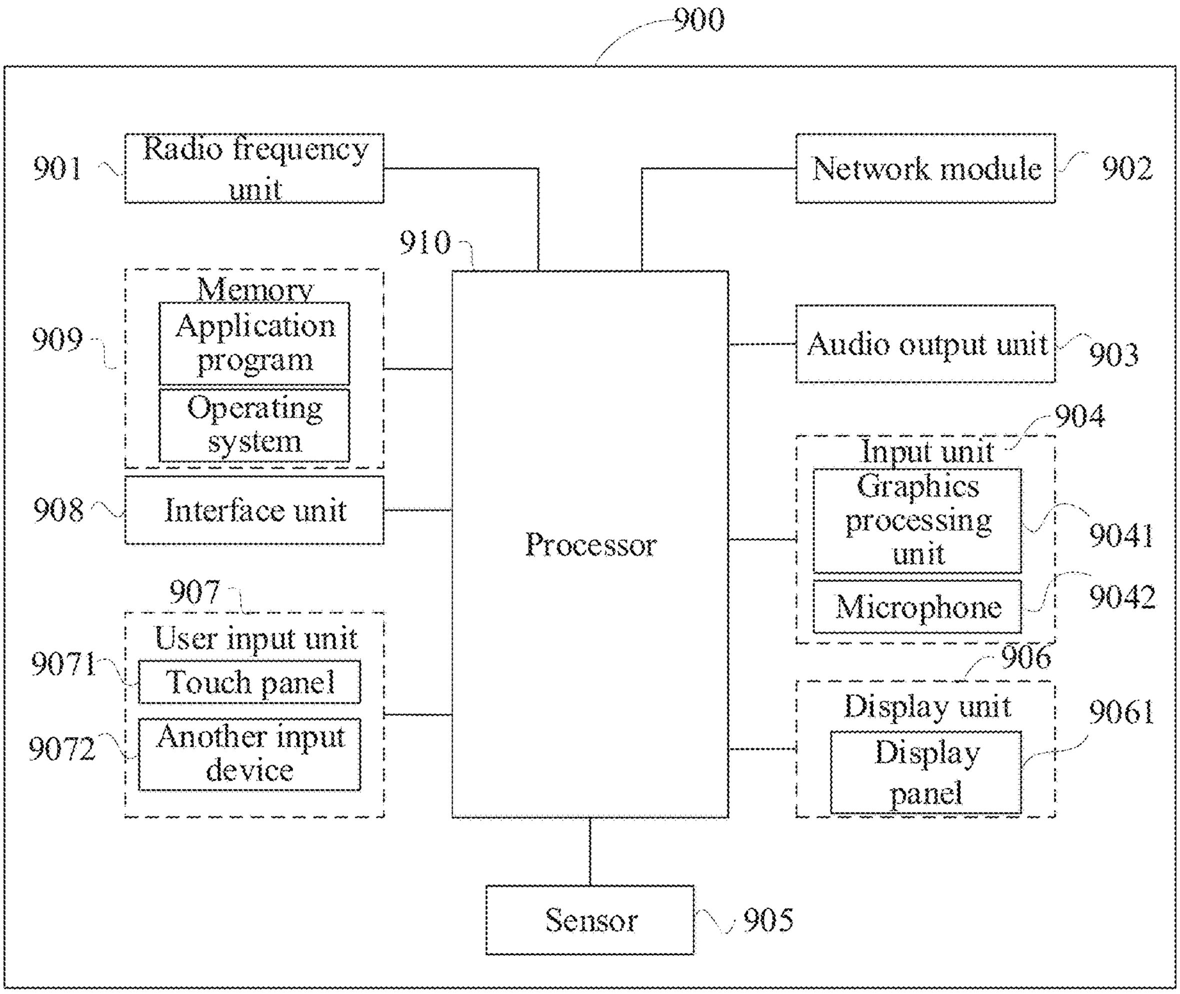
FIG. 9 is a structural diagram of a terminal according to an embodiment of this application.

FIG. 9 is a schematic diagram of a hardware structure of a terminal according to each embodiment of this application.

The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

It may be understood by a person skilled in the art that the terminal 900 may further include a power supply (such as a battery) that supplies power to each component. The power supply may be logically connected to the processor 910 by using a power management system, to implement functions such as charging, discharging, and power consumption management by using the power management system. A structure of the terminal shown in FIG. 9 does not constitute a limitation on the terminal device, and may include more or fewer parts than those shown in the figure, or combine some parts, or have different part arrangements. Details are not described herein again.

It should be understood that, in this embodiment of this application, the input unit 904 may include a Graphics Processing Unit (GPU) 9041 and a microphone 9042. The graphics processing unit 9041 processes image data of a static picture or a video obtained by an image capture apparatus (such as a camera) in a video capture mode or an image capture mode. The display unit 906 may include a display panel 9061, and the display panel 9061 may be configured in a form of a liquid crystal display, an organic light emitting diode, or the like. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to one or more of a physical keyboard, a function key (such as a volume control key or an on/offkey), a trackball, a mouse, a joystick, and the like. Details are not described herein.

In this embodiment of this application, after receiving downlink data from a network device, the radio frequency unit 901 sends the downlink data to the processor 910 for processing, and sends uplink data to the network device. Generally, the radio frequency unit 901 includes but is not limited to an antenna, at least one amplifier, a transceiver, a coupler, a low noise amplifier, a duplexer, and the like.

The memory 909 may be configured to store a software program or an instruction and various data. The memory 909 may mainly include a storage program or instruction area and a storage data area, where the storage program or instruction area may store an operating system, an application program or an instruction required by at least one function (such as a sound play function or an image play function), and the like. In addition, the memory 909 may include a high-speed random access memory, and may further include a non-volatile memory. The non-volatile memory may be a Read-only Memory (ROM), a Programmable ROM (PROM), an Erasable PROM (EPROM), an Electrically EPROM (EEPROM), or a flash memory, for example, at least one magnetic disk storage device, a flash memory device, or another non-volatile solid-state storage device.

The processor 910 may include one or more processing units. In some embodiments, the processor 910 may be integrated with an application processor and a modem processor. The application processor mainly processes an operating system, a user interface, an application program or an instruction, and the like, and the modem processor mainly processes wireless communication, for example, a baseband processor. It may be understood that the modem processor may also not be integrated into the processor 910.

The radio frequency unit 901 is configured to send a message A in two-step random access.

The message A includes a preamble and a physical uplink shared channel PUSCH.

At least one of related information of the preamble and related information of the PUSCH indicates location-related information of the terminal.

The terminal sends the message A that includes the preamble and the PUSCH in two-step random access. Because at least one of the related information of the preamble and the related information of the PUSCH can indicate the location-related information of the terminal, a network device may receive the message A, that is, receive the preamble and the PUSCH, and may further learn the location-related information of the terminal according to at least one of the related information of the preamble and the related information of the PUSCH, to determine sending-related information of a message B in two-step random access, so that random access in a cell free scenario can be implemented.

Figure 10:
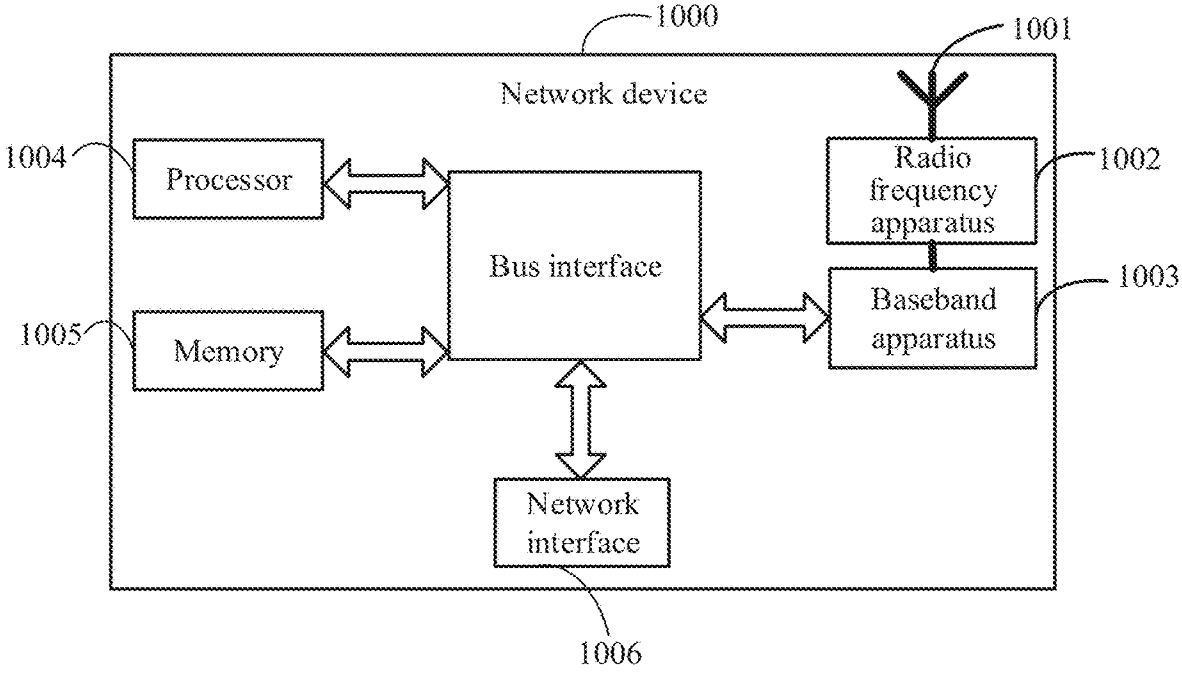
FIG. 10 is a structural diagram of a network device according to an embodiment of this application.

For example, an embodiment of this application further provides a network device. As shown in FIG. 10, the network device 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and sends the received information to the baseband apparatus 1003 for processing. In a downlink direction, the baseband apparatus 1003 processes to-be-sent information, and sends the to-be-sent information to the radio frequency apparatus 1002. After processing the received information, the radio frequency apparatus 1002 sends the information by using the antenna 1001.

The foregoing band processing apparatus may be located in the baseband apparatus 1003. In the foregoing embodiment, a method performed by the network device may be implemented in the baseband apparatus 1003. The baseband apparatus 1003 includes a processor 1004 and a memory 1005.

For example, the baseband apparatus 1003 may include at least one baseband board. Multiple chips are disposed on the baseband board. As shown in FIG. 10, one chip is, for example, the processor 1004, and is connected to the memory 1005, to invoke a program in the memory 1005 to perform an operation of the network side device shown in the foregoing method embodiment.

The baseband apparatus 1003 may further include a network interface 1006, configured to exchange information with the radio frequency apparatus 1002, where the interface is, for example, a Common Public Radio Interface (CPRI).

For example, the network device in this embodiment of this application further includes an instruction or a program that is stored in the memory 1005 and that can run on the processor 1004. The processor 1004 invokes the instruction or the program in the memory 1005 to perform the method performed by the modules shown in FIG. 7, and a same technical effect is achieved. To avoid repetition, details are not described herein.

An embodiment of this application further provides a readable storage medium. The readable storage medium stores a program or an instruction. When the program or the instruction is executed by a processor, the foregoing processes of the embodiment of the random access method performed by the terminal or the random access method performed by the network device are implemented, and a same technical effect can be achieved. To avoid repetition, details are not described herein again.

The processor is a processor in the communication device in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip. The chip includes a processor and a communication interface, the communication interface is coupled to the processor, and the processor is configured to run a program or an instruction, to implement the foregoing processes of the embodiment of the random access method performed by the terminal or the random access method performed by the network device, and a same technical effect can be achieved. To avoid repetition, details are not described herein again.

An embodiment of this application further provides a computer program product. The program product is stored in a non-volatile storage medium, and the program is executed by at least one processor to implement the foregoing processes of the embodiment of the random access method, and a same technical effect can be achieved. To avoid repetition, details are not described herein again.

An embodiment of this application provides a communication device, which is configured to perform the foregoing processes of the embodiment of the random access method, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term “include”, “including”, or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement “including a . . . ” does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. In some embodiments, the technical solutions of this application or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. A random access method, performed by a terminal, comprising:
- sending a message A in two-step random access, wherein:
  - the message A comprises a preamble and a Physical Uplink Shared Channel (PUSCH); and
  - related information of the preamble indicates location-related information of the terminal, or the related information of the preamble and related information of the PUSCH jointly indicate location-related information of the terminal,
  - wherein:
    - in response to that the related information of the preamble and the related information of the PUSCH jointly indicate the location-related information of the terminal, the related information of the preamble indicates first information of the location-related information, and the related information of the PUSCH indicates second information of the location-related information; and
    - the related information of the preamble comprises at least one of the following: sequence information, time domain resource information, or frequency domain resource information.

2. The random access method according to claim 1, after the sending a message A in two-step random access, the method further comprising:
- receiving a message B in two-step random access that is sent by at least one first node; wherein
- sending-related information of the message B is associated with at least one of the related information of the preamble or the related information of the PUSCH; and
- the sending-related information of the message B comprises at least one of the following:
- identifier information of the at least one first node; or
- beam-related information for sending the message B.

3. The random access method according to claim 2, further comprising:
- receiving N4 second measurement signals, wherein the N4 second measurement signals are sent by the at least one first node, and N4 is an integer greater than or equal to 1; and receiving the message B according to beam-related information of the N4 second measurement signals.

4. The random access method according to claim 1, before the sending a message A in two-step random access, the method further comprising:

measuring N1 first measurement signals to determine the location-related information of the terminal, and determining at least one of the following according to the location-related information:

the related information of the preamble or the related information of the PUSCH, wherein the N1 first measurement signals are sent by at least one first node, and N1 is an integer greater than or equal to 1; or the method further comprising:

measuring N2 first measurement signals to determine the related information of the preamble, wherein the N2 first measurement signals are sent by at least one first node, and N2 is an integer greater than or equal to 1; or the method further comprising:

measuring the N3 first measurement signals to determine at least one of transmit power of the message A and a transmit carrier, wherein the N3 first measurement signals are sent by at least one first node, and N3 is an integer greater than or equal to 1, and the sending a message A in two-step random access comprises:

sending the message A according to at least one of the transmit power of the message A or the transmit carrier.

5. The random access method according to claim 4, wherein the determining transmit power of the message A comprises:

separately determining N3 path loss values by using receive power of the N3 first measurement signals; and determining the transmit power of the message A according to the N3 path loss values.

6. The random access method according to claim 1, wherein the related information of the PUSCH comprises at least one of the following:

bit information carried on the PUSCH;

demodulation reference signal-related information of the PUSCH;

time domain resource information of the PUSCH; or frequency domain resource information of the PUSCH.

7. The random access method according to claim 1, wherein the location-related information comprises at least one of the following:

location information; or a measurement related to a location.

8. The random access method according to claim 1, further comprising:

sending a first reference signal associated with a terminal identifier; and receiving a message B in two-step random access that is sent by at least one first node; wherein sending-related information of the message B is associated with location-related information determined by using the first reference signal; and the sending-related information of the message B comprises at least one of the following:

identifier information of the at least one first node; or beam-related information for sending the message B.

9. The random access method according to claim 8, wherein the first reference signal is sent before or after the PUSCH, or on at least one symbol of a slot in which the PUSCH is located.

10. The random access method according to claim 1, further comprising:

receiving related information of multiple nodes, wherein the related information of the multiple nodes comprises at least one of the following:

identifiers of the multiple nodes;

locations of the multiple nodes;

information about synchronization signals or reference signals associated with the multiple nodes; or random access resource information associated with the multiple nodes.

11. A random access method, performed by a network device, comprising:

receiving a message A in two-step random access, wherein the message A comprises a preamble and a Physical Uplink Shared Channel (PUSCH); and obtaining at least one of related information of the preamble or related information of the PUSCH, wherein the related information of the preamble indicates location-related information of a terminal, or the related information of the preamble and the related information of the PUSCH jointly indicate location-related information of the terminal wherein:

in response to that the related information of the preamble and the related information of the PUSCH jointly indicate the location-related information of the terminal, the related information of the preamble indicates first information of the location-related information, and the related information of the PUSCH indicates second information of the location-related information; and the related information of the preamble comprises at least one of the following: sequence information, time domain resource information, or frequency domain resource information.

12. The random access method according to claim 11, after the obtaining at least one of related information of the preamble or related information of the PUSCH, the method further comprising:

determining sending-related information of a message B in two-step random access according to at least one of the related information of the preamble or the related information of the PUSCH; and sending the message B by using at least one first node according to the sending-related information of the message B, wherein the sending-related information of the message B is associated with at least one of the related information of the preamble or the related information of the PUSCH, and the sending-related information of the message B comprises at least one of the following:

identifier information of the at least one first node; or beam-related information for sending the message B.

13. The random access method according to claim 11, further comprising:

sending N1 first measurement signals by using at least one first node, wherein the N1 first measurement signals are used to determine the location-related information of the terminal, wherein N1 is an integer greater than or equal to 1.

14. The random access method according to claim 11, further comprising:

Sending N2 first measurement signals by using at least one first node, wherein the N2 first measurement signals are used to determine the related information of the preamble, wherein N2 is an integer greater than or equal to 1.

15. The random access method according to claim 11, further comprising:

sending N3 first measurement signals by using at least one first node, wherein the N3 first measurement signals are used to determine at least one of transmit power of the message A or a transmit carrier, wherein N3 is an integer greater than or equal to 1.

16. The random access method according to claim 11, further comprising:

receiving a first reference signal associated with a terminal identifier, determining sending-related information of a message B in two-step random access according to the first reference signal, and sending the message B by using at least one first node according to the sending-related information of the message B, wherein the sending-related information of the message B comprises at least one of the following:

identifier information of the at least one first node; or beam-related information for sending the message B.

17. A communication device, comprising a processor; a memory having a computer program or an instruction stored thereon, wherein the computer program or the instruction, when executed by the processor, causes the processor to perform a random access method, comprising:

sending a message A in two-step random access, wherein:

the message A comprises a preamble and a Physical Uplink Shared Channel (PUSCH); and related information of the preamble indicates location-related information of the terminal, or the related information of the preamble and related information of the PUSCH jointly indicate location-related information of the terminal, wherein:

in response to that the related information of the preamble and the related information of the PUSCH jointly indicate the location-related information of the terminal, the related information of the preamble indicates first information of the location-related information, and the related information of the PUSCH indicates second information of the location-related information; and the related information of the preamble comprises at least one of the following: sequence information, time domain resource information, or frequency domain resource information.

* * * * *